(No Model.)
J. CURRIER.
CARRIAGE SEAT.
No. 460,910. Patented Oct. 6, 1891.
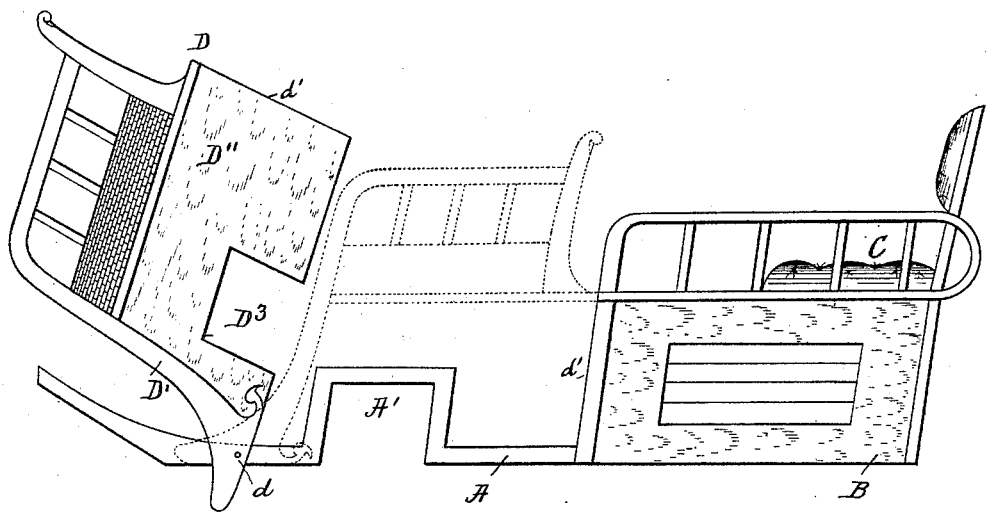
Witnesses.
Alice A. Perkins.
Joseph F. Hankins.
Inventor.
John Currier
by J. Van Andrew, his atty.

UNITED STATES PATENT OFFICE.

JOHN CURRIER, OF AMESBURY, MASSACHUSETTS.

CARRIAGE-SEAT.

SPECIFICATION forming part of Letters Patent No. 460,910, dated October 6, 1891.

Application filed May 22, 1891. Serial No. 393,689. (No model.)

*To all whom it may concern:*

Be it known that I, JOHN CURRIER, a citizen of the United States, and a resident of Amesbury, in the county of Essex and State of Massachusetts, have invented new and useful Improvements in Carriages, of which the following, taken in connection with the accompanying drawing, is a specification.

This invention relates to improvements in two-seated carriages of the kind in which the side sills are "cut under" or provided with what is termed in the trade as a "wheel-house," and it is carried out as follows, reference being had to the accompanying drawing, which represents a side elevation of a carriage-body made in accordance with my invention.

In the drawing, A represents one of the side sills, which is cut under or provided with a wheel-house A', as is usual, for the purpose of permitting the wheel to pass freely under the carriage-body in turning sharply round curves, &c.

B represents one of the stationary rear side panels, and C is the rear seat, as usual.

D is the front seat, and D' is one of its front pillars, of which there are, as usual, two, one at each side of the seat. Each of said pillars is pivoted in its lower forward end at $d$ to the side sill A, as shown, so as to permit the front seat to be swung forward, as shown in full lines in the drawing, for the purpose of enabling passengers to enter and leave the rear part of the carriage with ease and facility.

D'' is one of the side panels of the front seat, each such panel having a cut-away portion $D^3$ on its under side, as shown in full lines in the drawing, which cut-away portion coincides with the cut-under or wheel-house A' of the carriage-body when the front seat is swung into working position, as shown in dotted lines in the drawing, thus permitting the wheels to pass freely under the wheel-house without being obstructed by the side panels of the front seat when the latter is in working position.

$d'$ is the dividing-line, on which the side panel of the carriage is cut, and it divides the front panel D'' from the rear panel B, as shown in the drawing.

The space in front of the forward seat is without sides or panels and is of the kind termed "cut down," as shown in the drawing, so as to give space for swinging the said seat forward, as shown. When the front seat is swung into working position, as shown in dotted lines, the rear edge of the front-seat panel D'' fits against the forward edge of the rear-seat panel B on the dividing-line $d'$, thus giving the appearance of a non-movable front seat.

The pivoted front seat may be non-divided, extending the whole width of the body of the carriage, or it may be divided longitudinally in the line of said carriage-body, so as to form two independently-adjustable front-seat portions, as is common in the art, without departing from the essence of my invention.

I am aware that it is common to have a two-seated carriage-body having the front seat connected with the side portions of the body directly under the seat and not connected with but pivoted to the side or bottom sill of the body forward of the front seat, so as to permit such seat to be swung forward or upward out of working position for the purpose of facilitating access to or egress from the rear seat; but in such carriages the bottom line of bodies under the front seat has been made without any cut-under or wheel-house, and I do not claim such construction as my invention; but

What I claim as my invention, and wish to secure by Letters Patent, is—

The combination, with a rear seat C and the side sills A, constructed with an under-cut or wheel-house A', of a pivoted upwardly and rearwardly swinging front seat D, having side panels D'', arranged to rest against the front of the rear seat side panels when in normal position, and formed with cut-out portions $D^3$ in their lower edges, which correspond in shape to and receive the under-cut or wheel-house of the side sills, substantially as described.

In testimony whereof I have signed my name to this specification, in the presence of two subscribing witnesses, on this 19th day of May, A. D. 1891.

JOHN CURRIER.

Witnesses:
ALBAN ANDRÉN,
JOHN W. HALL.